US011523295B2

(12) United States Patent
Harada et al.

(10) Patent No.: US 11,523,295 B2
(45) Date of Patent: Dec. 6, 2022

(54) TERMINAL AND METHOD FOR COMMUNICATING WITH A FIRST BASE STATION APPARATUS AND A SECOND BASE STATION APPARATUS

(71) Applicant: NTT DOCOMO, INC., Tokyo (JP)

(72) Inventors: Hiroki Harada, Tokyo (JP); Yousuke Sano, Tokyo (JP); Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 43 days.

(21) Appl. No.: 16/763,095

(22) PCT Filed: Nov. 16, 2017

(86) PCT No.: PCT/JP2017/041379
§ 371 (c)(1),
(2) Date: May 11, 2020

(87) PCT Pub. No.: WO2019/097660
PCT Pub. Date: May 23, 2019

(65) Prior Publication Data
US 2020/0389929 A1     Dec. 10, 2020

(51) Int. Cl.
*H04W 24/10*     (2009.01)
*H04W 28/08*     (2009.01)
(Continued)

(52) U.S. Cl.
CPC ....... *H04W 24/10* (2013.01); *H04W 28/0819* (2020.05); *H04W 36/0069* (2018.08);
(Continued)

(58) Field of Classification Search
CPC ... H04B 7/02–12; H04B 17/0082–3913; H04J 11/0069–0093; H04J 2011/0096;
(Continued)

(56) References Cited

U.S. PATENT DOCUMENTS

2016/0014706 A1* 1/2016 Vajapeyam .......... H04W 24/10
2017/0134976 A1   5/2017 Uchino et al.
(Continued)

FOREIGN PATENT DOCUMENTS

JP    2016048857 A    4/2016
WO   2016068072 A1   5/2016

OTHER PUBLICATIONS

Extended European Search Report issued in counterpart European Patent Application No. 17932295.3, dated Jun. 7, 2021 (13 pages).
(Continued)

*Primary Examiner* — Timothy J Weidner
(74) *Attorney, Agent, or Firm* — Osha Bergman Watanabe & Burton LLP (57) ABSTRACT

A user apparatus communicates with a first base station apparatus and a second base station apparatus, and the user apparatus includes a receiving unit configured to receive, from the first base station apparatus, a configuration for measuring a timing difference between the first base station apparatus and the second base station apparatus; a control unit configured to execute measurement with respect to the second base station apparatus, based on the configuration for measuring the timing difference; and a transmitting unit configured to transmit a result of the executed measurement, to the first base station apparatus, wherein the executed measurement is executed before starting to communicate with the second base station apparatus.

6 Claims, 6 Drawing Sheets

(51) Int. Cl.
| | |
|---|---|
| H04W 36/00 | (2009.01) |
| H04W 56/00 | (2009.01) |
| H04W 72/04 | (2009.01) |
| H04W 76/15 | (2018.01) |
| H04W 84/02 | (2009.01) |
| H04W 88/06 | (2009.01) |
| H04W 88/10 | (2009.01) |
| H04W 92/02 | (2009.01) |
| H04W 92/10 | (2009.01) |

(52) U.S. Cl.
CPC ....... *H04W 56/001* (2013.01); *H04W 56/003* (2013.01); *H04W 56/0045* (2013.01); *H04W 72/0446* (2013.01); *H04W 76/15* (2018.02); *H04W 84/02* (2013.01); *H04W 88/06* (2013.01); *H04W 88/10* (2013.01); *H04W 92/02* (2013.01); *H04W 92/10* (2013.01)

(58) Field of Classification Search
CPC .. H04L 5/003–0098; H04W 8/22–245; H04W 24/02–10; H04W 28/02–26; H04W 36/0005–385; H04W 48/02–20; H04W 56/0005–0095; H04W 72/005–14; H04W 74/002–008; H04W 76/10–50; H04W 84/02–16; H04W 88/005–12; H04W 92/02; H04W 92/04; H04W 92/10
See application file for complete search history.

(56) References Cited

U.S. PATENT DOCUMENTS

| | | |
|---|---|---|
| 2017/0238301 A1 | 8/2017 | Nakazawa et al. |
| 2017/0257788 A1* | 9/2017 | Takahashi ............. H04W 24/10 |
| 2018/0323927 A1* | 11/2018 | Nagaraja ........... H04W 36/0072 |

OTHER PUBLICATIONS

NTT Docomo, Inc.; "Discussion on measurement gap for NR"; 3GPP TSG-RAN WG4 Meeting NR #84, R4-1707931; Berlin, Germany; Aug. 21-25, 2017 (3 pages).
3GPP TR 38.804 V14.0.0 "3rd Generation Partnership Project; Technical Specification Group Radio Access Network; Study on New Radio Access Technology; Radio Interface Protocol Aspects (Release 14)" Mar. 2017 (57 pages).
3GPP TS 37.340 V1.0.2 "3rd Generation Partnership Project; Technical Specification Group Radio Access Network; Evolved Universal Terrestrial Radio Access (E-UTRA) and NR; Multi-connectivity; Stage 2 (Release 15)" Sep. 2017 (45 pages).
3GPP TS 36.331 V14.4.0 "3rd Generation Partnership Project; Technical Specification Group Radio Access Network; Evolved Universal Terrestrial Radio Access (E-UTRA); Radio Resource Control (RRC); Protocol specification (Release 14)" Sep. 2017 (753 pages).
International Search Report issued in International Application No. PCT/JP2017/041379, dated Jan. 30, 2018 (5 pages).
Written Opinion issued in International Application No. PCT/JP2017/041379; dated Jan. 30, 2018 (4 pages).

* cited by examiner

TERMINAL AND METHOD FOR COMMUNICATING WITH A FIRST BASE STATION APPARATUS AND A SECOND BASE STATION APPARATUS

TECHNICAL FIELD

The present invention relates to a user apparatus in a radio communication system.

BACKGROUND ART

Presently, in the 3GPP (Third Generation Partnership Project), as a successor to the LTE (Long Term Evolution) system and the LTE-Advanced system, specifications of a new radio communication system referred to as a New Radio Access Technology (NR) system, are being developed (for example, Non-Patent Literature 1).

In the NR system, similar to dual connectivity in the LTE system, introduction of a technique referred to as LTE-NR dual connectivity or multi RAT (Multi Radio Access Technology) dual connectivity is being discussed. Specifically, in this technique, data is divided between the base station (eNB) of the LTE system and the base station (gNB) of the NR system, and data is transmitted and received simultaneously by these base stations (for example, Non-Patent Literature 2). Furthermore, in the LTE-LTE dual connectivity, SSTD (SFN and Subframe Timing Difference) is supported. Specifically, in SSTD, the user apparatus measures the difference in the SFN (System Frame Number) and the subframe timing between the eNB that is the master node and the eNB that is the secondary node, and reports the difference to the network (for example, Non-Patent Document 3).

CITATION LIST

Non-Patent Literature

[NPTL 1]
3GPP TR 38.804 V14.0.0 (2017-03)
[NPTL 2]
3GPP TS 37.340 V1.0.2 (2017-09)
[NPTL 3]
3GPP TS 36.331 V14.4.0 (2017-09)

SUMMARY OF INVENTION

Technical Problem

In LTE-NR dual connectivity, when performing asynchronous dual connectivity, it is unknown how much the frame difference, the slot difference, or the symbol timing difference is between the master node eNB and the secondary node gNB, and, therefore, the user apparatus needs to perform measurement with respect to the NR carrier of gNB. However, the procedures for executing such measurement have not been established.

In view of the above problem, a problem to be solved by the present invention is to execute, by the user apparatus, measurement for dual connectivity with base stations of the same RAT or different RATs, the dual connectivity being executed in a radio communication system using at least NR.

Solution to Problem

According to the disclosed technology, there is provided a user apparatus for communicating with a first base station apparatus and a second base station apparatus, the user apparatus including a receiving unit configured to receive, from the first base station apparatus, a configuration for measuring a timing difference between the first base station apparatus and the second base station apparatus; a control unit configured to execute measurement with respect to the second base station apparatus, based on the configuration for measuring the timing difference; and a transmitting unit configured to transmit a result of the executed measurement, to the first base station apparatus, wherein the executed measurement is executed before starting to communicate with the second base station apparatus.

Advantageous Effects of Invention

According to the disclosed technology, the user apparatus can execute measurement for dual connectivity executed in a radio communication system using at least NR.

DESCRIPTION OF EMBODIMENTS

Embodiments of the present invention will be described below with reference to the drawings. Note that the embodiments described below are merely examples, and embodiments to which the present invention is applied are not limited to the following embodiments.

In operations of the radio communication system of the present embodiment, the existing technology is appropriately used. The existing technology is, for example, existing LTE; however, the existing technology is not limited to the existing LTE. Furthermore, the term "LTE" used in the present specification has a broad meaning including LTE-Advanced and methods after LTE-Advanced (for example, NR), unless otherwise specified.

Furthermore, in the embodiment to be described below, terms such as SS (Synchronization Signal), PSS (Primary SS), SSS (Secondary SS), PBCH (Physical broadcast Channel), and PRACH (Physical RACH), etc., used in the existing LTE, are used; however, this is for the sake of convenience of description, and signals, functions, etc., similar to these may be referred to by other names. Furthermore, the above terms in NR are denoted as NR-SS, NR-PSS, NR-SSS, NR-PBCH, NR-PRACH, etc.

Figure 1:
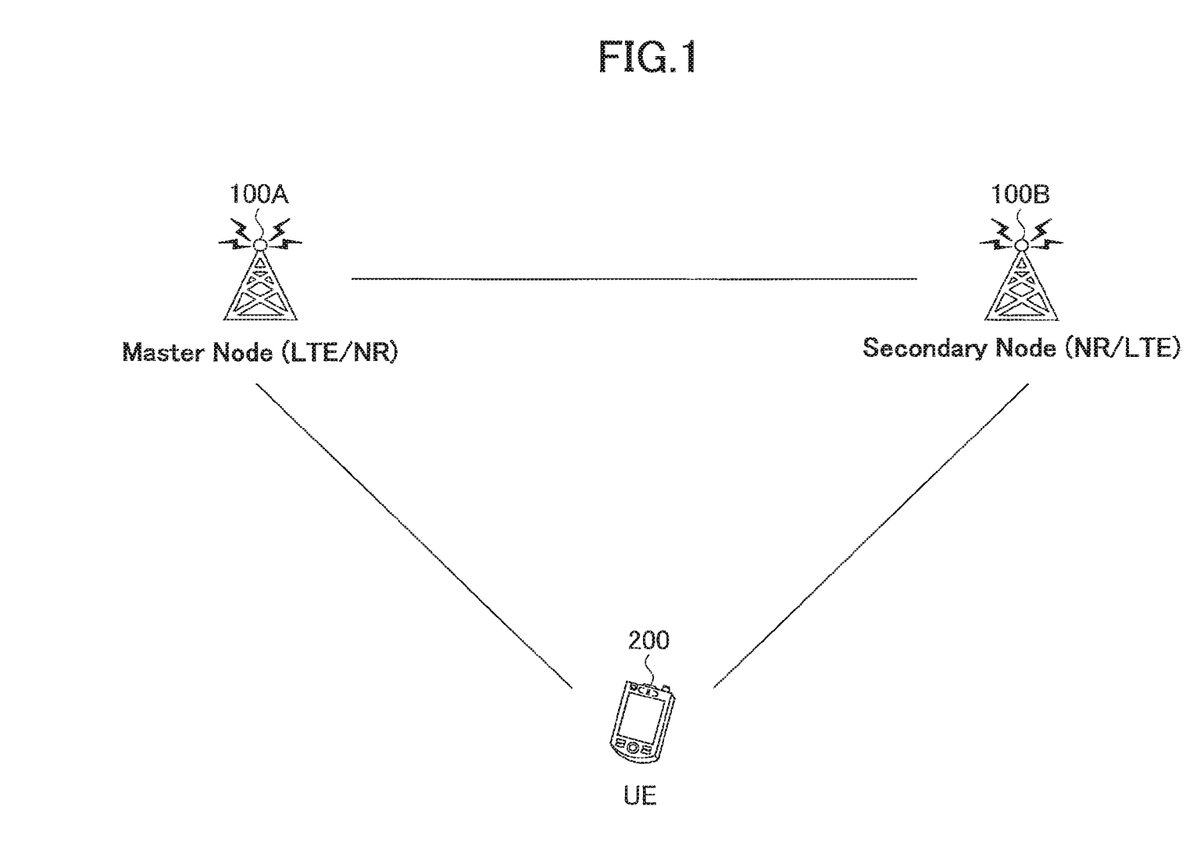
FIG. 1 is a diagram illustrating a configuration example of a radio communication system according to an embodiment of the present invention.

FIG. 1 is a configuration example of a radio communication system according to an embodiment of the present invention. With reference to FIG. 1, an outline of a radio communication system according to the embodiment of the present invention will be described.

As illustrated in FIG. 1, a user apparatus 200 (hereinafter also referred to as "UE 200") connects to and communicates with a base station apparatus 100A and a base station apparatus 100B (hereinafter referred to as the "base station apparatus 100" when the base station apparatus 100A and the base station apparatus 100B are not distinguished) respectively provided by the LTE system and the NR system, and the user apparatus 200 also supports LTE-NR dual connectivity in which the base station apparatus 100A is a master node and the base station apparatus 100B is a secondary node. That is, the user apparatus 200 is able to execute simultaneous transmission or simultaneous reception with the base station apparatus 100A that is the master node and the base station apparatus 100B that is the secondary node, by simultaneously using a plurality of component carriers provided by the base station apparatus 100A that is the master node and the base station apparatus 100B that is the secondary node. Note that in FIG. 1, only one base station apparatus is illustrated for each of the LTE system and the NR system; however, in general, in the LTE system or the NR system, a large number of base station apparatuses 100 are arranged so as to cover the respective service areas.

Note that the following embodiments are described with respect to LTE-NR dual connectivity. The user apparatus according to the present disclosure is not limited to LTE-NR dual connectivity, but is applicable to dual connectivity between multiple radio communication systems using different RATs, that is, multiple RAT dual connectivity. Furthermore, the user apparatus according to the present disclosure is also applicable to NR-NR dual connectivity using the same RAT. Hereinafter, dual connectivity is also referred to as "DC".

Note that in the present embodiment, the duplex method may be the TDD (Time Division Duplex) method, the FDD (Frequency Division Duplex) method, or other methods (for example, the Flexible Duplex method).

Furthermore, in the following description, transmitting a signal using a transmission beam may be transmitting a signal multiplied by a precoding vector (precoded with a precoding vector). Similarly, receiving a signal using a reception beam may be performed by multiplying the received signal by a predetermined weight vector. Furthermore, transmitting a signal using a transmission beam may be expressed as transmitting a signal by a specific antenna port. Similarly, receiving a signal using a reception beam may be expressed as receiving a signal by specific antenna port. The antenna port refers to a logical antenna port or a physical antenna port defined by the 3GPP standard. Note that the method of forming a transmission beam and a reception beam is not limited to the above method. For example, in the base station apparatus 100 and the user apparatus 200 having a plurality of antennas, a method of changing the angle of each antenna may be used, or a method using a combination of a method of using a precoding vector and a method of changing the angle of the antenna may be used, a method of switching between different antenna panels may be used, a method of combining a plurality of antenna panels may be used, or another method may be used. Furthermore, for example, in the high frequency band, a plurality of mutually different transmission beams may be used. Using a plurality of transmission beams is referred to as a multi-beam operation, and using one transmission beam is referred to as a single beam operation.

Embodiments

Embodiments will be described below.

Figure 2:
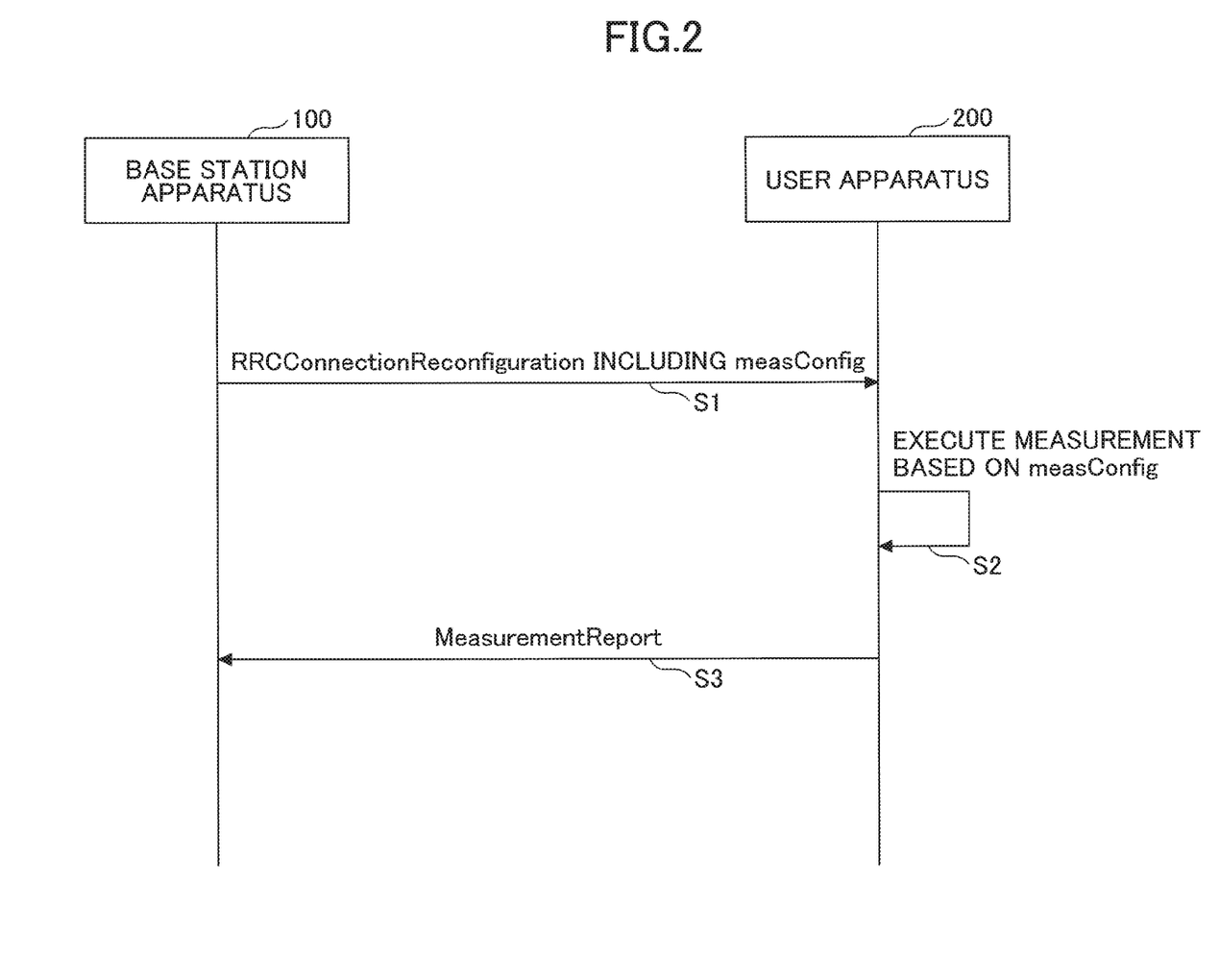
FIG. 2 is a diagram illustrating an example of a sequence of measurement procedures according to the embodiment of the present invention.

FIG. 2 is a diagram illustrating an example of a sequence of measurement procedures according to an embodiment of the present invention. In step S1, the base station apparatus 100 transmits RRCConnectionReconfiguration including an information element measConfig, to the user apparatus 200 via an RRC message. The measConfig includes information related to configurations of measurement to be executed by the user apparatus 200. For example, information related to intra-frequency measurement, inter-frequency measurement, inter-RAT mobility measurement, measurement gap configuration, etc., may be included. Note that RRCConnectionReconfiguration is one example, and measConfig may be indicated by another RRC message, for example, measConfig may be transmitted to the user apparatus 200 via RRCConnectionResume.

In step S2, the user apparatus 200 executes measurement based on the configuration according to measConfig received in step S1. With respect to the LTE cell or the NR cell, necessary measurements are performed.

In step S3, the user apparatus 200 transmits the measurement result executed in step S2 to the base station apparatus 100 via the RRC message MeasurementReport. The base station apparatus 100 refers to the received measurement result and performs configuration and scheduling, etc., of radio resources necessary for the user apparatus 200.

Here, it is assumed that asynchronous DC is performed between the LTE node and the NR node. In asynchronous DC, it is unknown how much the radio frame difference, the slot difference, or the symbol timing difference is, between the LTE node and the NR node. In the DC of LTE-LTE, SSTD measurement is supported, in which the user apparatus 200 measures the SFN and the subframe timing between the master node (also referred to as "PCell") and the secondary node (also referred to as "PSCell"), and reports the measurement results to the base station apparatus 100. By executing the SSTD measurement, for example, the active period of DRX (discontinuous reception) can be synchronized between the master node and the secondary node.

In the SSTD measurement in LTE, the user apparatus 200 measures the SFN offset, the frame boundary offset, and the subframe boundary offset between the PCell and the PSCell, and reports the measurement results to the base station apparatus 100. The following is an example of the RRC message "MeasResultSSTD" related to the configuration of the SSTD measurement by the user apparatus 200.

MeasResultSSTD-r13::=SEQUENCE {
   sfn-OffsetResult-r13 INTEGER (0 . . . 1023),
   frameBoundaryOffsetResult-r13 INTEGER (−5 . . . 4),
   subframeBoundaryOffsetResult-r13 INTEGER (0 . . . 127)}

The sfn-OffsetResult is an information element corresponding to the SFN offset, and takes a value from 0 to 1023. The frameBoundaryOffsetResult is an information element corresponding to a frame boundary offset, and takes a value from −5 to 4. The subframeBoundaryOffsetResult is an information element corresponding to a subframe boundary offset, and takes a value from 0 to 127. The base station apparatus 100 causes the user apparatus 200 to measure "MeasResultSSTD" and report the measurement result, after configuration of the PSCell.

On the other hand, in order for the user apparatus 200 to configure the PSCell, it is necessary to execute cell detection and report the result to the base station apparatus 100. In asynchronous DC in LTE, the PSCell is configured by the following procedures.

1) Inter-frequency measurement is configured in the user apparatus 200 from the master node.
2) The master node recognizes the ID of the PSCell from the measurement report result, and configures the PSCell in the user apparatus 200.
3) The master node configures the SSTD measurement with respect to the user apparatus 200.
4) According to the SSTD measurement result report from the user apparatus 200, the master node recognizes the timing offset between the master node and the secondary node, and shares the timing offset with the secondary node.

Figure 3:
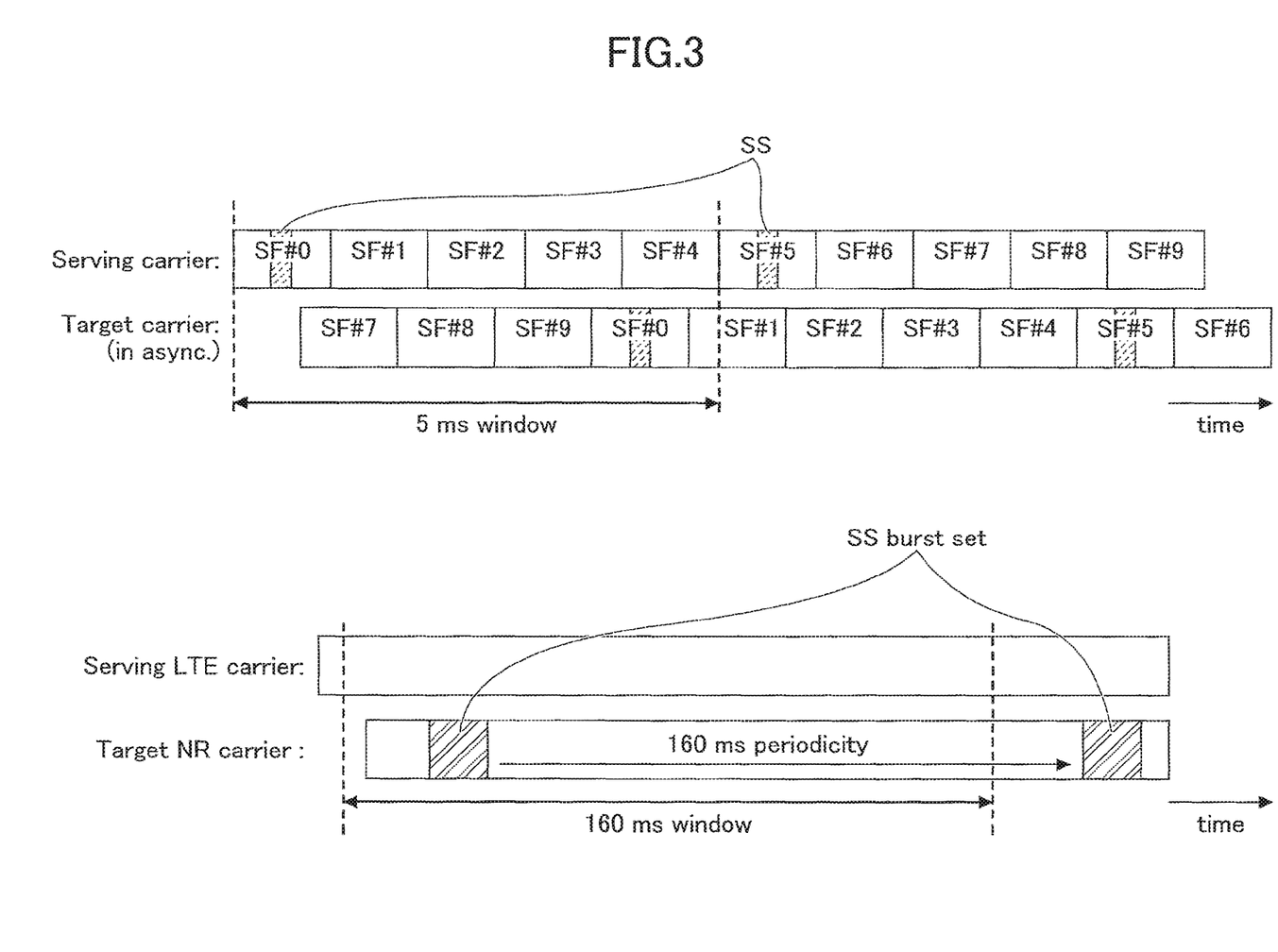
FIG. 3 is a diagram illustrating an example (1) of measurement procedures in asynchronous DC according to the embodiment of the present invention.

FIG. 3 is a diagram illustrating an example (1) of the measurement procedure in the asynchronous DC according to the embodiment of the present invention. The operation in the case where the procedure in the asynchronous DC of LTE-LTE described in FIG. 2 is applied to the asynchronous DC of LTE-NR will be described.

When the measurement target is an LTE carrier performing asynchronous DC, inter-frequency measurement is configured in the user apparatus 200 from the master node of the LTE. Depending on the capabilities of the user apparatus, there are cases where a measurement gap is also configured for measurement of different frequencies, and cases where a measurement gap is not configured. As illustrated in the upper diagram of FIG. 3, in LTE, the transmission cycle of the synchronization signals is 5 ms, and, therefore, even in the case where the master node and the secondary node are asynchronous, measurement can be performed by a window of 5 ms. In the upper diagram of FIG. 3, a synchronization signal SS (Synchronization Signal) is detected in SF (sub-frame) #0 and SF #5. That is, the 5 ms window includes at least one SS transmitted in SF #0 or SF #5.

On the other hand, when the measurement target is an NR carrier that performs asynchronous DC, the Inter RAT NR measurement is configured in the user apparatus 200 from the master node of the LTE. As in the case of measuring the LTE carrier, a measurement gap is also configured according to the capability of the user apparatus if necessary. As illustrated in the lower diagram of FIG. 3, 5 ms, 10 ms, 20 ms, 40 ms, 80 ms, or 160 ms can be set in the transmission cycle of the SS blocks including the synchronization signals in NR, and, therefore, when the master node and the secondary node are asynchronous and a transmission cycle of 160 ms is used in the secondary node, a window of 160 ms is necessary to detect the synchronization signal. That is, the 160 ms window includes at least one SS burst set. Note that the SS burst set is formed of one or more SS blocks.

Figure 4:
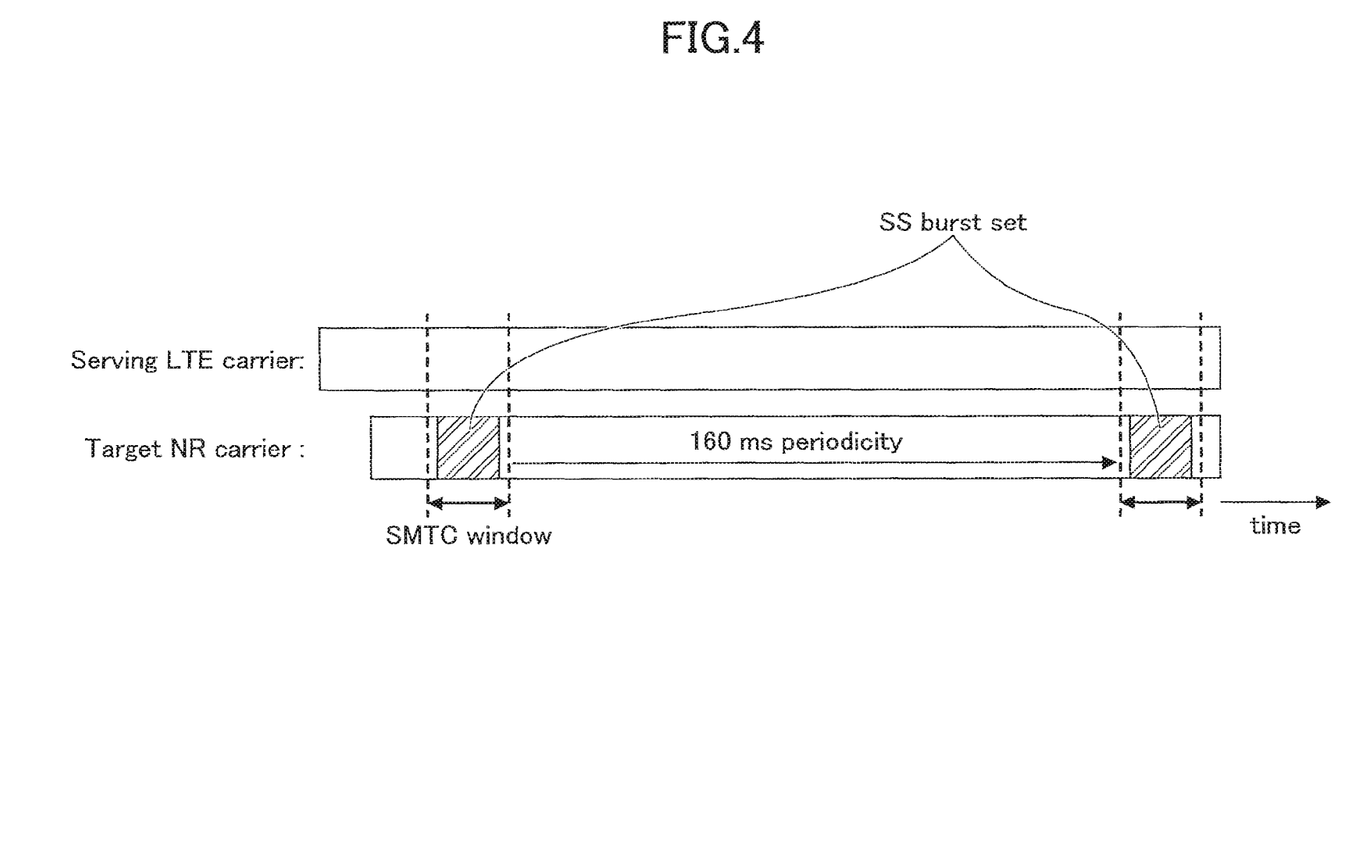
FIG. 4 is a diagram illustrating an example (2) of measurement procedures in asynchronous DC according to the embodiment of the present invention.

FIG. 4 is a diagram illustrating an example (2) of the measurement procedures in the asynchronous DC according to the embodiment of the present invention. As illustrated in FIG. 3, in the NR, the transmission cycle of the SS blocks can be set from 5 ms to 160 ms, and, therefore, when the NR carrier is the measurement target, there are cases where the necessary measurement gap length in inter-RAT measurement increases.

Here, when the timing difference between the master node and the secondary node is obtained in advance by the SSTD measurement in the network, an appropriate measurement window timing can be set in the user apparatus 200. As illustrated in FIG. 4, it is possible to set the SMTC (SS block measurement timing control) window to be shorter than the cycle in which the SS burst is transmitted, so as to include the period during which the SS burst set is transmitted. However, the SSTD measurement is measurement of the timing difference between the PCell and a specific PSCell, and, therefore, the user apparatus 200 cannot perform the SSTD measurement unless the PSCell is discovered and configured. For this reason, measurement of SS blocks is necessary for SSTD measurement, so the measurement gap length, which is necessary for performing SSTD measurement on different frequency carriers, increases.

Therefore, in order to efficiently execute the asynchronous DC of the LTE-NR, for example, there is a need for a measurement procedure for avoiding a state where communication is impossible in the serving cells due to a large measurement gap length, without a mechanism for measuring the timing difference on the network side.

As the measurement procedure, there is a procedure that enables SSTD measurement to be configured in the user apparatus 200 before configuration of the PSCell. For example, by a new information element "report-interRAT-SSTD-Meas", the SSTD measurement is configured in the user apparatus 200 before configuration of the PSCell. With the information element "report-interRAT-SSTD-Meas", the user apparatus 200 measures the SSTD between the PCell and the inter-RAT cell detected in a specified carrier. From the Measurement object, etc., a part of or all of the following parameters can be set.

1) Measurement target frequency and SS block frequency position
2) SS burst set periodicity
3) SMTC cycle and period, and any of {5, 10, 20, 40, 80, 160} ms as the SMTC window period
4) Subcarrier spacing of SS blocks
5) Reporting number of cells
6) Reporting cycle and number of times of reporting, etc.
7) Report content With respect to 1) measurement target frequency and SS block frequency position, 2) SS burst set periodicity, 3) SMTC cycle and period, and any of {5, 10, 20, 40, 80, 160} ms as the SMTC window period, and 4) subcarrier spacings of SS blocks, the PCell acquires the information of the NR cells that can be PSCells in the vicinity of the PCell itself in advance, so that the information of 1) to 4) is indicated to the user apparatus 200. The information of 1) to 4) is semi-static information of the surrounding NR cells, and by acquiring this information by the user apparatus 200, the measurement gap in the case of detecting the NR cells can be shortened.

With respect to 5) reporting number of cells, when multiple cells are configured, multiple cell IDs and SSTD measurement results for the respective cells may be reported.

With respect to 6) reporting cycle and number of times of reporting, etc., cyclic reports may be configured, or the number of times of reporting may be configured. For example, when a NR cell is not detected in the target frequency, the user apparatus 200 may make reports and stop making measurement reports when a predetermined number of reports are made or a predetermined time elapses, or may not make any reports and stop making measurement reports when a predetermined time elapses.

With respect to 7) report content, in addition to the SSTD measurement result, a part of or all of RSRP (Reference Signal Received Power), RSRQ (Reference Signal Received Quality), SINR (Signal to Interference plus Noise power Ratio) of the detected cell, and the ID or RSRP of the beam, may be configured to be reported.

Furthermore, based on the information of the SS burst set periodicity applied at the secondary node, Inter-RAT SSTD measurement accompanying the measurement gap may be configured from the master node to the user apparatus 200. For example, a value obtained by adding 1 ms of returning time to {5, 10, 20, 40, 80, 160} ms, may be set as the measurement gap length. The measurement gap cycle may be, for example, {40, 80} ms, or another value may be set.

In a serving cell in which a measurement gap for Inter-RAT SSTD measurement is configured, reception of PDSCH or PDCCH and transmission of PUCCH or PUSCH, etc., within the measurement gap, need not be executed.

The measurement gap for Inter-RAT SSTD measurement is configured separately from the measurement gap for regular inter-frequency measurement or inter-RAT measurement. In the case where a plurality of measurement gaps overlap, the user apparatus 200 may prioritize the measurement gap for Inter-RAT SSTD measurement, or may prioritize the measurement gap for regular inter-frequency measurement or inter-RAT measurement.

With respect to the PCell belonging to the master node and the SCell being carrier aggregated, when the measurement gap for the Inter-RAT SSTD measurement is configured, the deactivation timer of the SCell may be stopped during the measurement gap period. By stopping the deactivation timer, it is possible to prevent the SCell from being deactivated for the measurement gap for Inter-RAT SSTD measurement.

Furthermore, when the Inter-RAT SSTD measurement is configured from the master node, the user apparatus 200 may measure the target frequency by an operation corresponding to the intra-frequency measurement. That is, the user apparatus 200 measures the target frequency without the measurement gap. Based on the timing of the PCell, the user apparatus 200 executes the SSTD measurement based on the configured timing, for example, the timing, the period, or the cycle of the SMTC.

Note that it may be assumed that interruption temporarily occurs at the serving cell at the timing when the Inter-RAT SSTD measurement is configured, that is, at the start time of the SMTC window. In the user apparatus 200, an interruption occurs, for example, by an on/off operation or a switching operation, etc., of the RF module. However, SSTD measurement of surrounding NR cells becomes possible without configuring a large measurement gap.

Here, when configuring the PSCell in the user apparatus 200 based on the SSTD measurement result report, it may be assumed that further interruptions will not occur. This is because if the report acquired by the SSTD measurement can be used for configuring the PSCell, there is no need to turn off/on or switch the RF module again.

Furthermore, the Inter-RAT SSTD measurement report may include the following information.
1) Detected cell ID
2) SFN offset
3) Frame boundary offset
4) Slot boundary offset
5) Measurement result related to power
6) Beam ID With respect to 1) detected cell ID, the user apparatus 200 may report a plurality of cell IDs, with a configured reporting number of cells being the upper limit.

With respect to 2) SFN offset, the user apparatus 200 may make a report for each detected cell.

With respect to 3) frame boundary offset, the user apparatus 200 may make a report for each detected cell. The bit width indicating the information of the offset may be changed according to the subcarrier spacings of the configured SS Blocks. For example, the user apparatus 200 reports the slot index in the NR cell whose timing matches the boundary of the PCell subframe #0.

With respect to 4) slot boundary offset, the user apparatus 200 may make a report for each detected cell. The bit width indicating the information of the offset may be changed according to the subcarrier spacings of the configured SS Blocks. For example, the user apparatus 200 reports the index in units of symbols in the NR cell whose timing matches the PCell sub-frame boundary.

With respect to 5) measurement result related to power, the measurement result may be, for example, RSRP, RSRQ, or SINR, and the measurement result is reported for each detected cell. When the report of the beam measurement result is configured in the user apparatus 200, RSRP, RSRQ, or SINR may be reported for each detected beam.

With respect to 6) beam ID, when the report of the beam measurement result is configured in the user apparatus 200, the beam measurement result is reported for each detected beam.

Note that the above SSTD measurement is executed before the PSCell is configured; however, the above SSTD measurement may be similarly performed even after the PSCell is configured. In the SSTD measurement, the timing difference between the PCell and the configured PSCell is measured and reported.

In the above embodiment, the user apparatus 200 can measure the SSTD of the candidate NR cell and the cell of the master node before configuring the PSCell that performs the dual connectivity, based on the configuration for measuring the SSTD indicated from the base station apparatus 100. The user apparatus 200 can acquire information related to the SS block of the NR cell as a PSCell candidate, such as the frequency position, the transmission cycle, the subcarrier spacings, etc., thereby executing efficient measurement.

That is, the user apparatus can execute measurement for dual connectivity executed in a radio communication system using at least NR.

(Apparatus Configuration)

Next, a functional configuration example of the base station apparatus 100 and the user apparatus 200 that execute the processes and operations described above will be described. Each of the base station apparatus 100 and the user apparatus 200 includes at least functions for implementing the embodiment. However, each of the base station apparatus 100 and the user apparatus 200 may have only some of the functions in the embodiment.

Figure 5:
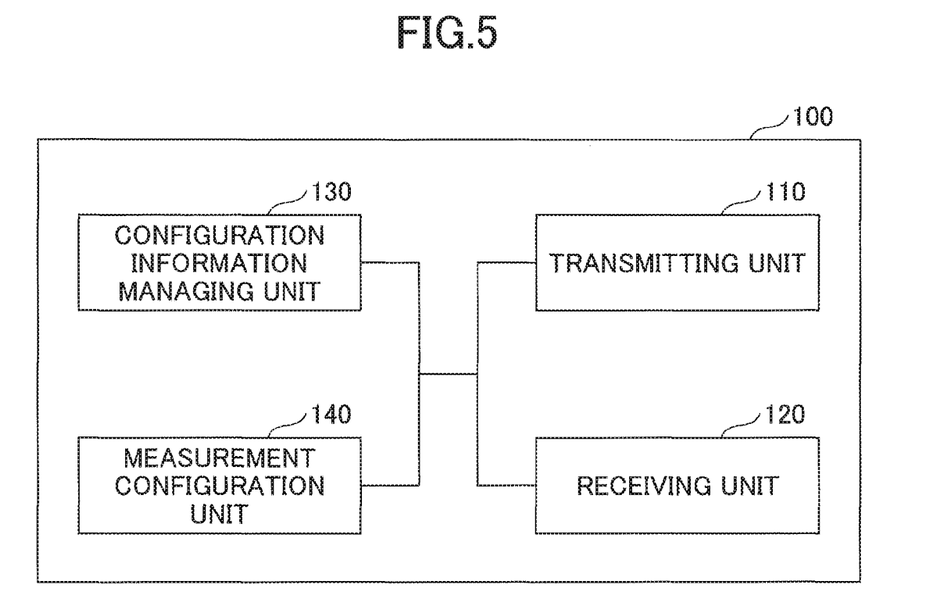
FIG. 5 is a diagram illustrating an example of a functional configuration of a base station apparatus 100 according to the embodiment of the present invention.

FIG. 5 is a diagram illustrating an example of a functional configuration of the base station apparatus 100. As illustrated in FIG. 5, the base station apparatus 100 includes a transmitting unit 110, a receiving unit 120, a configuration information managing unit 130, and an initial access configuration unit 140. The functional configuration illustrated in FIG. 5 is merely an example. As long as the operations according to the embodiment of the present invention can be executed, the functional sections and the names of the functional units may be any section or name.

The transmitting unit 110 includes a function of generating signals to be transmitted to the user apparatus 200 and wirelessly transmitting the signals. The receiving unit 120 includes a function of receiving various signals transmitted from the user apparatus 200 and acquiring, for example, information of a higher layer from the received signals. Furthermore, the transmitting unit 110 has a function of transmitting NR-PSS, NR-SSS, NR-PBCH, DL/UL control signals, etc., to the user apparatus 200. Furthermore, the transmitting unit 110 transmits information related to the transmission power control, information related to the scheduling, and information related to the measurement configuration to the user apparatus 200, and the receiving unit 120 receives a message related to the report of the measurement result from the user apparatus 200.

The configuration information managing unit 130 stores preset configuration information and various kinds of configuration information to be transmitted to the user apparatus 200. The content of the configuration information is, for example, information used for configuring measurement in the user apparatus 200.

The measurement configuration unit 140 performs control related to the generation of information used for the configuration of the measurement executed in the user apparatus 200, and control related to the processing of the measurement result received from the user apparatus 200, described in the embodiment.

Figure 6:
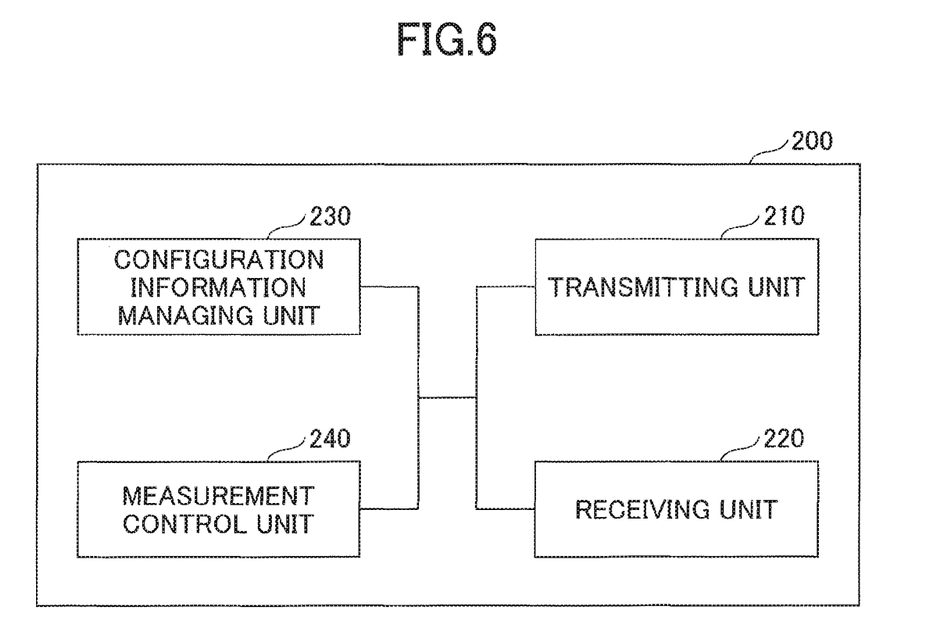
FIG. 6 is a diagram illustrating an example of a functional configuration of a user apparatus 200 according to the embodiment of the present invention.

FIG. 6 is a diagram illustrating an example of a functional configuration of the user apparatus 200. As illustrated in FIG. 6, the user apparatus 200 includes a transmitting unit 210, a receiving unit 220, a configuration information managing unit 230, and an initial access control unit 240. The functional configuration illustrated in FIG. 6 is merely an example. As long as the operations according to the embodiment of the present invention can be executed, the functional sections and the names of the functional units may be any section or name.

The transmitting unit 210 creates transmission signals from transmission data and wirelessly transmits the transmission signals. The receiving unit 220 wirelessly receives various signals, and acquires signals of a higher layer from the received signals of the physical layer. Furthermore, the receiving unit 220 has a function of receiving NR-PSS, NR-SSS, NR-PBCH, DL/UL control signals, etc., transmitted from the base station apparatus 100. Furthermore, the transmitting unit 210 transmits a message related to the measurement result report to the base station apparatus 100, and the receiving unit 120 receives the information used for configuring the measurement from the base station apparatus 100.

The configuration information managing unit 230 stores various kinds of configuration information received from the base station apparatus 100 by the receiving unit 220. Furthermore, the configuration information managing unit 230 also stores preset configuration information. The content of the configuration information is, for example, information pertaining to configurations for executing measurement, etc.

The measurement control unit 240 performs control related to execution of measurement in the user apparatus 200 described in the embodiment. Note that the functional unit related to the measurement result transmission, etc., in the measurement control unit 240 may be included in the transmitting unit 210 and the functional unit related to the configuration reception relevant to measurement in the measurement control unit 240 may be included in the receiving unit 220.

(Hardware Configuration)

The functional configuration diagrams (FIGS. 5 and 6) used for describing the embodiment of the present invention described above are blocks of functional units. These functional blocks (constituent units) are implemented by any combination of hardware and/or software. Means for implementing each functional block is not particularly limited. That is, each functional block may be implemented by one device in which a plurality of elements are physically and/or logically combined, or two or more devices physically and/or logically separated may be directly and/or indirectly (for example, in a wired and/or wireless manner) connected to each other, and each functional block may be implemented by these plural devices.

Figure 7:
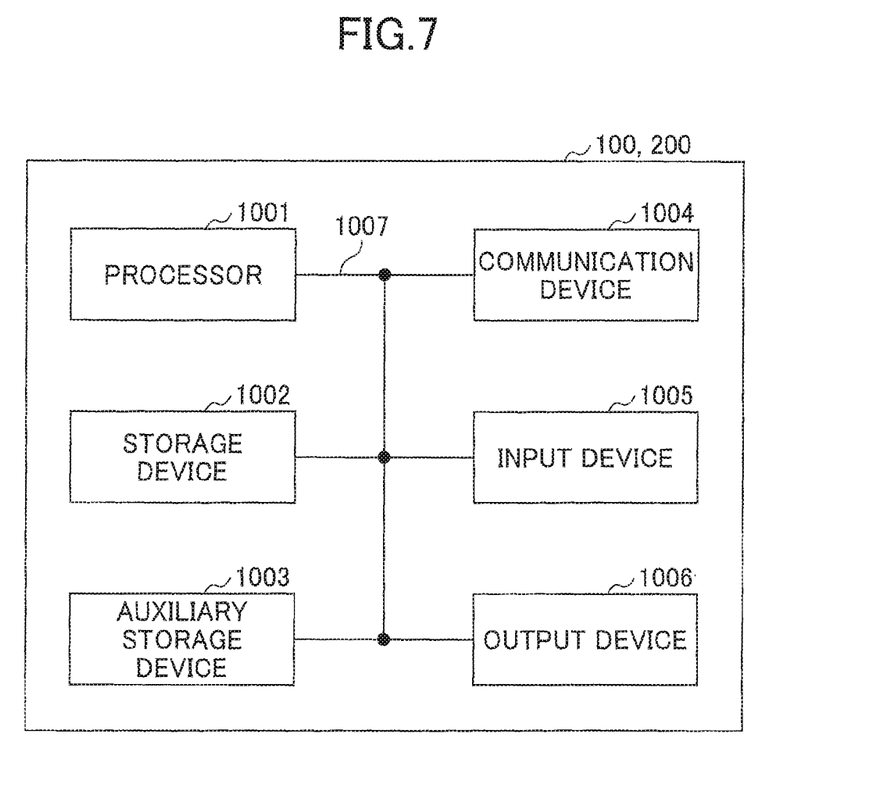
FIG. 7 is a diagram illustrating an example of a hardware configuration of the base station apparatus 100 or the user apparatus 200.

Furthermore, for example, the base station apparatus 100 and the user apparatus 200 according to the embodiment of the present invention may both function as a computer that performs processes according to the embodiment of the present invention. FIG. 7 is a diagram illustrating an example of a hardware configuration of a radio communication apparatus that is the base station apparatus 100 or the user apparatus 200 according to the embodiment of the present invention. Each of the base station apparatus 100 and the user apparatus 200 described above may be formed as a computer apparatus physically including a processor 1001, a storage device 1002, an auxiliary storage device 1003, a communication device 1004, an input device 1005, an output device 1006, a bus 1007, etc.

Note that in the following description, the term "device" can be read as a circuit, a device, a unit, etc. The hardware configuration of the base station apparatus 100 and the user apparatus 200 may be configured to include one or a plurality of devices denoted by 1001 to 1006 illustrated in the figure, or may be configured to not include some of the devices.

The functions of the base station apparatus 100 and the user apparatus 200 are implemented by loading predetermined software (program) in hardware such as the processor 1001 and the storage device 1002, computing by the processor 1001, communicating by the communication device 1004, and controlling the reading and/or writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register, etc.

Furthermore, the processor 1001 loads a program (program code), a software module, or data from the auxiliary storage device 1003 and/or the communication device 1004, into the storage device 1002, and executes various processes according to the program, the software module, or the data. As the program, a program for causing a computer to execute at least part of the operations described in the above embodiment is used. For example, the transmitting unit 110, the receiving unit 120, the configuration information managing unit 130, and the measurement configuration unit 140 of the base station apparatus 100 illustrated in FIG. 5 may be implemented by a control program stored in the storage device 1002 and operating on the processor 1001. Furthermore, for example, the transmitting unit 210, the receiving unit 220, the configuration information managing unit 230, and the measurement control unit 240 of the user apparatus 200 illustrated in FIG. 6 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a ROM (Read Only Memory), an EPROM (Erasable Programmable ROM), an EEPROM (Electrically Erasable Programmable ROM), and a RAM (Random Access Memory). The storage device 1002 may be referred to as a register, a cache, and a main memory, etc. The storage device 1002 can store executable programs (program codes), software modules, etc., for implementing the process according to the embodiment of the present invention.

The auxiliary storage device 1003 is a computer-readable recording medium, and may be formed of, for example, at least one of an optical disk such as a CD-ROM (Compact Disc ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip, etc. The auxiliary storage device 1003 may be referred to as a secondary storage device. The above-described storage medium may be, for example, a database including the storage device 1002 and/or the auxiliary storage device 1003, a server, or another appropriate medium.

The communication device 1004 is hardware (transmission/reception device) for performing communication between computers via a wired and/or wireless network, and is also referred to as a network device, a network controller, a network card, and a communication module, etc., for example. For example, the transmitting unit 110 and the receiving unit 120 of the base station apparatus 100 may be implemented by the communication device 1004. Furthermore, the transmitting unit 210 and the receiving unit 220 of the user apparatus 200 may be implemented by the communication device 1004.

The input device 1005 is an input device (for example, a keyboard, a mouse, a microphone, a switch, a button, and a sensor, etc.) that accepts input from the outside. The output device 1006 is an output device (for example, a display, a speaker, and an LED lamp, etc.) that performs output to the outside. Note that the input device 1005 and the output device 1006 may be integrated (for example, a touch panel).

Furthermore, the respective devices such as the processor 1001 and the storage device 1002 are connected by a bus 1007 for communicating information. The bus 1007 may be formed of a single bus or may be formed of different buses between the devices.

Furthermore, each of the base station apparatus 100 and the user apparatus 200 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented with at least one of these hardware elements.

Overview of Embodiment

As described above, according to the embodiment of the present invention, there is provided a user apparatus for communicating with a first base station apparatus and a second base station apparatus, the user apparatus including a receiving unit configured to receive, from the first base station apparatus, a configuration for measuring a timing difference between the first base station apparatus and the second base station apparatus; a control unit configured to execute measurement with respect to the second base station apparatus, based on the configuration for measuring the timing difference; and a transmitting unit configured to transmit a result of the executed measurement, to the first base station apparatus, wherein the executed measurement is executed before starting to communicate with the second base station apparatus.

According to the above configuration, the user apparatus 200 can measure the SSTD between the candidate NR cell and the cell of the master node before configuring the PSCell that performs the dual connectivity, based on a configuration for measuring the SSTD indicated from the base station apparatus 100. That is, the user apparatus can execute measurement for dual connectivity executed in a radio communication system using at least NR.

The configuration for measuring the timing difference may include information related to the synchronization signal of the second base station apparatus. With this configuration, the user apparatus 200 can acquire information related to the SS block of the NR cell that is the PSCell candidate, thereby executing efficient measurement.

The configuration for measuring the timing difference may include a part of or all of information related to the frequency position of the synchronization signal of the second base station apparatus, information related to the transmission cycle of the synchronization signal of the second base station apparatus, and information related to the subcarrier spacings of the synchronization signals of the second base station apparatus. With this configuration, the user apparatus 200 can acquire information related to the SS block of the NR cell that is the PSCell candidate, such as the frequency position, the transmission cycle, and the subcarrier spacings, etc., thereby executing efficient measurement.

The measurement gap may be configured based on the information related to the synchronization signal of the second base station apparatus included in the configuration for measuring the timing difference. With this configuration, the user apparatus 200 can acquire information related to the SS block of the NR cell that is the PSCell candidate, thereby configuring an appropriate gap and executing efficient measurement.

The measurement gap to be configured may be shorter than the cycle at which the synchronization signal of the second base station apparatus is transmitted. With this configuration, the user apparatus 200 can acquire information related to the SS block of the NR cell that is a PSCell candidate and shorten the gap length, thereby executing efficient measurement.

The result of the measurement to be transmitted may include a part of or all of a cell ID of the second base station apparatus, an offset of the system frame number of the second base station apparatus, a frame boundary offset of the second base station apparatus, the slot boundary offset of the second base station apparatus, the measurement result related to power, and the beam ID. With this configuration, the user apparatus 200 can acquire information related to the SS block of the NR cell that is the PSCell candidate, thereby executing efficient measurement.

Supplement of Embodiment

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the base station apparatus 100 and the user apparatus 200 are described by using the functional block diagrams; however, such devices may be implemented in hardware, software, or combinations thereof. The software to be executed by the processor included in the base station apparatus 100 in accordance with the embodiment of the present invention and the software to be executed by the processor included in the user apparatus 200 may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Furthermore, notification of information is not limited to the aspect/embodiment described in the present specification and may be performed by other methods. For example, notification of information may be performed via physical layer signaling (for example, Downlink Control Information (DCI) or Uplink Control Information (UCI)), upper-layer signaling (for example, RRC (Radio Resource Control) signaling, MAC (Medium Access Control) signaling, broadcast information (Master Information Block (MIB), or System Information Block (SIB))), other signals, or by a combination thereof. Moreover, an RRC message may be referred to as the RRC signaling. Furthermore, RRC signaling may be referred to as the RRC message, and may be an RRC connection setup (RRC Connection Setup) message, a RRC connection reconfiguration (RRC Connection Reconfiguration) message, etc., for example.

Furthermore, each aspect/embodiment described in this specification can be applied to long term evolution (LTE), LTE-advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wideband (UWB), Bluetooth (registered trademark), any other systems using an appropriate system and/or next generation systems expanded on the basis of these systems.

In addition, processing procedures, sequences, flowcharts, etc., of each embodiment/modified example described in the specification may be exchanged as long as there is no inconsistency. For example, for the methods described in the specification, the elements of the various steps are presented in an exemplary order and are not limited to a specific order presented.

Certain operations performed by the base station apparatus 100 as described in the present specification may be performed by its upper node in some cases. In a network including one or more network nodes having base station apparatuses 100, various operations performed to communicate with user apparatuses 200 may be apparently performed by the base station apparatuses 100 and/or network nodes other than the base station apparatuses 100 (for example, a MME or an S-SW can be assumed, but the network nodes are not limited to them). Although it has been described that the single network node other than the base station apparatuses 100 is used in the above example, combinations of multiple other network nodes (for example, an MME and an S-GW) may be used.

Each aspect/embodiment described in this specification may be used alone, may be used in combination, or may be used while being switched during the execution.

The user apparatus 200 may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or any other appropriate terminologies.

The base station apparatus 100 may be referred to by those skilled in the art as NB (Node B), eNB (enhanced Node B), gNB, base station, or some other suitable terminology.

The terms "determining" and "deciding" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

As long as the terminologies "include", "including" and variations thereof are used in the present specification or claims, these terminologies are intended to be inclusive similar to the terminology "comprising". Furthermore, the terminology "or" as used in the present specification or claims is intended not to be an exclusive OR.

In the entire present disclosure, for example, if articles are added by translation, such as a, an, and the in English, these articles may indicate plurality, unless it is clearly indicated from the context that these articles do not indicate plurality.

Note that in the embodiment of the present invention, the measurement control unit 240 is an example of a control unit. The measurement configuration unit 140 is an example of a configuration unit.

Although the present invention has been described in detail, it is apparent to those skilled in the art that the present invention is not limited to the embodiments as described in the present specification. The present invention can be implemented as modifications and variations without departing from the sprit and scope of the present invention as defined in claims. Thus, the description in the present specification is intended for exemplary description and does not mean any restriction to the present invention.

REFERENCE SIGNS LIST 100 base station apparatus
200 user apparatus
110 transmitting unit
120 receiving unit
130 configuration information managing unit
140 measurement configuration unit
200 user apparatus
210 transmitting unit
220 receiving unit
230 configuration information managing unit
240 measurement control unit
1001 processor
1002 storage device
1003 auxiliary storage device
1004 communication device
1005 input device
1006 output device

The invention claimed is:

1. A terminal for communicating with a first base station apparatus and a second base station apparatus, the terminal comprising:
a receiving unit configured to receive, from the first base station apparatus, a configuration for measuring a timing difference between the first base station apparatus and the second base station apparatus;
a control unit configured to execute measurement with respect to the second base station apparatus, based on the configuration for measuring the timing difference; and
a transmitting unit configured to transmit a result of the executed measurement, to the first base station apparatus,
wherein the configuration for measuring the timing difference includes a subcarrier spacing of a synchronization signal block of the second base station apparatus,
wherein the executed measurement is executed before starting to communicate with the second base station apparatus, and
wherein the measurement is executed in a target frequency of the second base station apparatus, without a measurement gap, based on a timing configuration of a synchronization signal.

2. The terminal according to claim 1, wherein the configuration for measuring the timing difference includes at least one of information related to a frequency position of the synchronization signal of the second base station apparatus, information related to a transmission cycle of the synchronization signal of the second base station apparatus, and a number of report cells.

3. The terminal according to claim 2, wherein a measurement gap is configured based on the information related to the synchronization signals of the second base station apparatus included in the configuration for measuring the timing difference.

4. The terminal according to claim 3, wherein the measurement gap to be configured is shorter than the transmission cycle of the synchronization signals of the second base station apparatus.

5. The terminal according to claim 2, wherein the transmitted result of the executed measurement includes at least one of, for each cell of one or more of the second base station apparatus, the one or more being equal to or less than the number of report cells, a cell ID, an offset of a system frame number, a frame boundary offset, and a measurement result related to electric power.

6. A communication method of a terminal for communicating with a first base station apparatus and a second base station apparatus, the communication method comprising:
receiving, from the first base station apparatus, a configuration for measuring a timing difference between the first base station apparatus and the second base station apparatus;
executing measurement with respect to the second base station apparatus, in a target frequency of the second base station apparatus, without a measurement gap, based on the configuration for measuring the timing difference and a timing configuration of a synchronization signal; and
transmitting a result of the executed measurement, to the first base station apparatus,
wherein the executed measurement is executed before starting to communicate with the second base station apparatus, and
wherein the configuration for measuring the timing difference includes a subcarrier spacing of a synchronization signal block of the second base station apparatus.

* * * * *